US009608871B1

(12) United States Patent
Schumacher et al.

(10) Patent No.: US 9,608,871 B1
(45) Date of Patent: Mar. 28, 2017

(54) INTELLECTUAL PROPERTY CORES WITH TRAFFIC SCENARIO DATA

(71) Applicant: Xilinx, Inc., San Jose, CA (US)

(72) Inventors: Paul R. Schumacher, Berthoud, CO (US); Graham F. Schelle, Longmont, CO (US)

(73) Assignee: XILINX, INC., San Jose, CA (US)

( * ) Notice: Subject to any disclaimer, the term of this patent is extended or adjusted under 35 U.S.C. 154(b) by 355 days.

(21) Appl. No.: 14/280,211

(22) Filed: May 16, 2014

(51) Int. Cl.
 G06F 17/50 (2006.01)
 H04L 12/24 (2006.01)
 G06F 3/0484 (2013.01)

(52) U.S. Cl.
 CPC .......... H04L 41/22 (2013.01); G06F 3/04842 (2013.01); H04L 41/14 (2013.01)

(58) Field of Classification Search
 CPC ............. G06F 17/5022; G06F 17/5027; G06F 2217/86; G06F 13/22; G06F 13/4291; G06F 2217/84; G06F 13/1694; G06F 15/7864; G06F 17/5031; G06F 11/267; G06F 11/2733; G06F 17/5009; G06F 9/5072; G11C 11/04
 USPC ......................................... 716/100–108, 116
 See application file for complete search history.

(56) References Cited

U.S. PATENT DOCUMENTS

| | | | |
|---|---|---|---|
| 5,327,361 A | 7/1994 | Long et al. | |
| 5,548,785 A | 8/1996 | Fogg et al. | |
| 5,937,179 A | 8/1999 | Swoboda | |
| 5,946,472 A | 8/1999 | Graves et al. | |
| 7,290,228 B2 | 10/2007 | Guenther et al. | |
| 7,444,276 B2 | 10/2008 | Watt et al. | |
| 7,756,695 B2 | 7/2010 | O'Niell et al. | |
| 7,769,577 B2 | 8/2010 | Guenther et al. | |
| 7,865,346 B2 | 1/2011 | Gunther et al. | |
| 7,877,249 B2 | 1/2011 | Guenther et al. | |
| 8,413,088 B1 * | 4/2013 | Armbruster | G06F 17/5022 716/100 |
| 2003/0105617 A1 | 6/2003 | Cadambi et al. | |
| 2004/0078179 A1 | 4/2004 | Fuji et al. | |
| 2004/0123258 A1 | 6/2004 | Butts | |
| 2005/0256696 A1 | 11/2005 | Gooding et al. | |
| 2006/0155525 A1 | 7/2006 | Aguilar et al. | |
| 2006/0190232 A1 | 8/2006 | Guenther et al. | |
| 2007/0044079 A1 | 2/2007 | Ganesan et al. | |
| 2007/0067150 A1 | 3/2007 | Musselman | |
| 2007/0074000 A1 | 3/2007 | Colwill et al. | |
| 2007/0162270 A1 | 7/2007 | Guenther et al. | |
| 2007/0219771 A1 | 9/2007 | Verheyen et al. | |

(Continued)

OTHER PUBLICATIONS

Specification and drawings for U.S. Appl. No. 13/398,790, filed Feb. 16, 2012, Schumacher et al.

(Continued)

*Primary Examiner* — Binh Tat
(74) *Attorney, Agent, or Firm* — Kevin T. Cuenot

(57) ABSTRACT

Performance analysis for an electronic system includes determining, using a processor, data traffic patterns stored within a core library of an electronic design automation system, wherein the data traffic patterns are part of cores stored within the core library. The determined data traffic patterns are displayed using a display as modeling options. A user input selecting a displayed data traffic pattern is received; and the selected data traffic pattern is executed as part of modeling the electronic system.

17 Claims, 5 Drawing Sheets

(56) References Cited

U.S. PATENT DOCUMENTS

| | | | |
|---|---|---|---|
| 2007/0294071 | A1 | 12/2007 | Guenther et al. |
| 2008/0222633 | A1 | 9/2008 | Kami |
| 2008/0243462 | A1 | 10/2008 | Guenther et al. |
| 2008/0288230 | A1 | 11/2008 | Fernsler et al. |
| 2008/0306721 | A1 | 12/2008 | Yang |
| 2008/0306722 | A1 | 12/2008 | Fujii et al. |
| 2010/0201695 | A1 | 8/2010 | Hill et al. |
| 2011/0107162 | A1 | 5/2011 | Martinez Canedo et al. |
| 2011/0154280 | A1* | 6/2011 | Agarwal .................. G03F 1/70 716/106 |
| 2011/0307233 | A1 | 12/2011 | Tseng et al. |
| 2012/0144376 | A1 | 6/2012 | Van Eijndhoven et al. |
| 2012/0284446 | A1 | 11/2012 | Biran et al. |
| 2013/0170525 | A1 | 7/2013 | Asaad et al. |
| 2013/0212554 | A1 | 8/2013 | Maeda et al. |
| 2013/0326457 | A1* | 12/2013 | MacMunn .......... G06F 17/5072 716/122 |

OTHER PUBLICATIONS

Specification and drawings for U.S. Appl. No. 13/676,035, filed Nov. 13, 2012, Schumacher et al.
Specification and drawings for U.S. Appl. No. 14/278,263, filed May 15, 2014, Schumacher et al.
ARM, Inc., *ARM Profiler Non-Intrusive Performance Analysis*, pp. 1-3, announced by ARM Jul. 6, 2010, retrieved from the Internet: <http://www.ann.com/products/tools/software-tools/rvds/arm-profiler.php>, ARM Inc., San Jose, California, USA.
Berkeley Design Technology, Inc., *An Independent Evaluation of: The AutoESL AutoPilot High-Level Synthesis Tool*, copyright 2010, pp. 1-14, Berkeley Design Technology, Inc., Walnut Creek, California, USA.
Kyung, Hyun-Min et al., "Performance Monitor Unit Design for an AXI-based Multi-Core SoC Platform," *Proc. of 2007 ACM Symposium on Applied Computing*, Mar. 11, 2007, pp. 1565-1572, ACM, New York, New York, USA.
Park, Gi-Ho et al., "Building Various Levels of SOC Architecture Exploration Environments: System Level Simulator, Emulator and FPGA Prototype Board " *Proc. of the 2nd Workshop on Architectural Research Prototyping*, Jun. 9, 2007, pp. 1-5, retrieved from the Internet: <http://groups.csail.mit.edu/cag/warp2007/abstracts/park-samsungelectronics.pdf>.
Pratt, Brian et al., "Improving FPGA Design Robustness with Partial TMR," *44th Annual IEEE International Physics Symposium Proceedings*, Mar. 26, 2006, pp. 226-232, IEEE, Piscataway, New Jersey, USA.
Xilinx, Inc., *AXI Bus Functional Model v1.9*, PB 001, Jun. 22, 2011, pp. 1-3, Xilinx, Inc., San Jose, California, USA.
Xilinx, Inc., *AXI Bus Functional Model v2.1*, DS824, Oct. 19, 2011, pp. 1-51, Xilinx, Inc., San Jose, California, USA.

* cited by examiner ary tools for programmable ICs and, in particular, SOCs, are largely inadequate for evaluating the suitability of complex system architectures for a particular application. Those performance estimation tools that are available tend to be software-centric. While performance estimation tools may be developed that extend to hardware aspects of an SOC, the effort required for performance analysis of an arbitrary, complex system is significant and requires a large amount of domain specific knowledge.

INTELLECTUAL PROPERTY CORES WITH TRAFFIC SCENARIO DATA

TECHNICAL FIELD

This disclosure relates to integrated circuit (ICs) design and, more particularly, to using intellectual property (IP) cores including traffic scenario data.

BACKGROUND

Integrated circuits (ICs) can be implemented to perform a variety of functions. Some ICs can be programmed to perform specified functions. One example of an IC that can be programmed is a field programmable gate array (FPGA). An FPGA typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect circuitry and programmable logic circuitry. The programmable interconnect circuitry typically includes a large number of interconnect lines of varying lengths interconnected by programmable interconnect points (PIPs). The programmable logic circuitry implements the logic of a user design using programmable elements that can include, for example, function generators, registers, arithmetic logic, and so forth.

The programmable interconnect and programmable logic circuitries are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of programmable IC is the complex programmable logic device, or CPLD. A CPLD includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs also can be implemented in other ways, e.g., using fuse or antifuse technology. The phrase "programmable IC" can include, but is not limited to these devices and further can encompass devices that are only partially programmable. For example, one type of programmable IC includes a combination of hard-coded transistor logic and a programmable switch fabric that programmably interconnects the hard-coded transistor logic.

Modern programmable ICs often have complex system architectures. An example of a complex system architecture, sometimes called a system-on-chip (SOC), is an IC that includes a processor configured to execute user program code interacting with one or more circuit blocks sometimes referred to as Intellectual Property (IP) circuit blocks. The circuit blocks may be implemented within programmable circuitry of the IC. Building a final system using such a complex architecture is difficult and time consuming. In consequence, performance estimation tools are highly desirable to help one determine the suitability of a given IC architecture for a particular application.

Available performance estimation tools for programmable ICs and, in particular, SOCs, are largely inadequate for evaluating the suitability of complex system architectures for a particular application. Those performance estimation tools that are available tend to be software-centric. While performance estimation tools may be developed that extend to hardware aspects of an SOC, the effort required for performance analysis of an arbitrary, complex system is significant and requires a large amount of domain specific knowledge.

SUMMARY

A method includes determining, using a processor, data traffic patterns stored within a core library of an electronic design automation (EDA) system, wherein the data traffic patterns are part of cores stored within the core library, and displaying, using a display device, the determined data traffic patterns as modeling options. The method also includes receiving a user input selecting a displayed data traffic pattern and executing the selected data traffic pattern as part of modeling an electronic system.

A system includes a host data processing system comprising a memory storing program code, a display device, and a processor coupled to the memory and the display device. The processor, upon executing the program code, is programmed to initiate executable operations including determining data traffic patterns stored within a core library of an electronic design automation system, wherein the data traffic patterns are part of cores stored within the core library. The executable operations also include displaying on the display device the determined data traffic patterns as modeling options and receiving a user input selecting a displayed data traffic pattern. The executable operations further include executing the selected data traffic pattern as part of modeling an electronic system.

A non-transitory computer-readable medium has stored thereon instructions which, when executed by a processor, perform a method. The method includes determining, using the processor, data traffic patterns stored within a core library of an electronic design automation system, wherein the data traffic patterns are part of cores stored within the core library. The method also includes displaying, using a display device, the determined data traffic patterns as modeling options and receiving a user input selecting a displayed data traffic pattern. The method further includes executing the selected data traffic pattern as part of modeling an electronic system.

DETAILED DESCRIPTION

Figure 1:
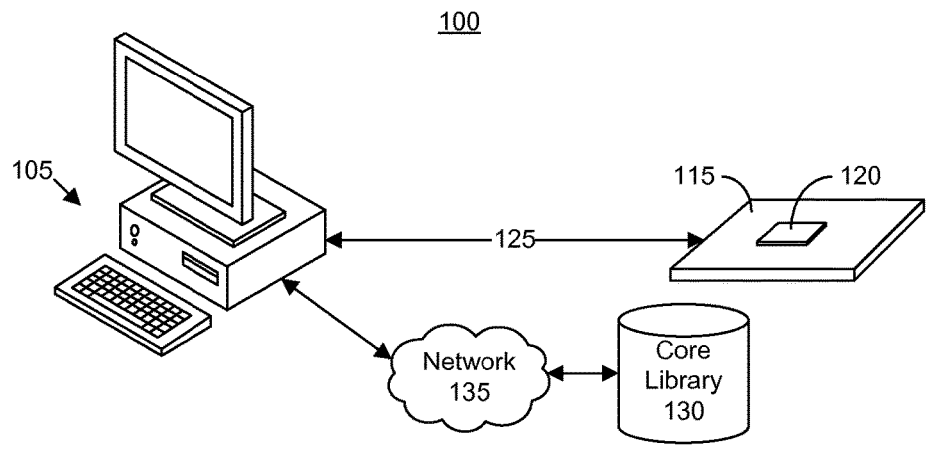
FIG. 1 is a block diagram illustrating an exemplary emulation environment.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuit (IC) design and, more particularly, to using intellectual property (IP) cores (cores) including traffic scenario data. In accordance with the inventive arrangements described herein, cores may be augmented to include one or more items of traffic scenario data. Traffic scenario data may include a variety of different types of information such as runtime configuration data for an IC, traffic generation data, or the like. The traffic scenario data may be packaged as part of a core. The core, including the traffic scenario data, may be stored within a core library used by an electronic design automation (EDA) system.

By including traffic scenario data within cores, various aspects of the cores relating to data traffic generation may be exposed to users through the EDA system. As defined herein, the term "user" means a human being. Users may select data traffic related parameters and/or situations as options and conduct performance analysis using the selected options. Performance analysis may include simulation and/or emulation of an electronic system. The user may select particular items of traffic scenario data for a given core that may be used to evaluate performance of the core within a larger electronic system. The user is able to evaluate performance of the core within the context of the larger electronic system without actually designing or implementing the electronic system and/or the core.

As defined within this disclosure, the term "emulation" means using hardware to mimic one or more behavioral characteristics and/or operations of another piece of hardware; or, using hardware to mimic one or more behavioral characteristics and/or operations of a core. In either case, the actual core is not implemented in hardware. Emulation typically occurs using an IC in which an emulation system is implemented. The IC is in communication with a host data processing system, e.g., a computer. Some components of the emulation system, e.g., the processor, may or may not perform the actual functions of the electronic system being emulated. Circuit blocks within the emulation system, e.g., emulation circuits, do not perform the actual functions of the circuit blocks being mimicked.

As defined herein, the term "simulate" refers to mimicking operation of an electronic system using software. Simulation is performed using a data processing system, e.g., a computer. Various portions of the electronic system being simulated are represented or mimicked by software models executing in the data processing system. The software models may be implemented using high level programming languages, hardware description languages, or the like. In some cases, simulation is cycle accurate. In other cases, simulation is not cycle accurate. In a non-cycle accurate context, simulation is sometimes referred to as "modeling." Within this specification, however, the term "modeling" is intended to refer to emulation and/or simulation, whether cycle accurate or not unless specifically explicitly stated otherwise.

Exposing various items of traffic scenario data from within cores allows a user to select data traffic generation behavior for the core when used in different applications for performance evaluation. As a result, the user need not have specialized knowledge relating to emulation and/or hardware design. The user may simply select one or more items of traffic scenario data exposed through the EDA system as a modeling option for high level performance analysis. The electronic system may be modeled and evaluated using the selected option(s).

Several additional definitions that apply throughout this document now will be presented. As defined herein, the term "intellectual property core" or "core" is a pre-designed and reusable unit of logic, cell, or chip layout design in the field of electronic circuit design. A core is expressed programmatically as a description of hardware that performs a particular function and is stored in a computer readable storage medium. A core may be expressed using hardware description language file(s), a bitstream that programs a programmable IC, or the like. A core may be used as a building block within an application-specific IC chip design, within a programmable IC circuit design, e.g., an FPGA circuit design, or the like.

A core further may include additional resources. Examples of the additional resources include, but are not limited to, source code such as hardware description language file(s), high level programming language file(s), and/or other simulation models, a bitstream or portion thereof, a netlist or portion thereof, schematics, documentation, and the like. Examples of different varieties of cores include, but are not limited to, digital signal processing (DSP) functions, memories, storage elements, math functions, etc. Some cores include an optimally floorplanned layout targeted to a specific family of ICs. Cores also may be parameterizable in that a user may enter parameters to activate or change certain functionality of a core. A core may include other resources such as traffic scenario data as described herein in further detail below.

As defined herein, the term "hardware description language" or "HDL" means a computer-language that facilitates the documentation, design, and manufacturing of a digital system, such as an IC. An HDL combines program verification techniques with expert system design methodologies. Using an HDL, for example, a user can design and specify an electronic circuit, describe the operation of the circuit, and create tests to verify operation of the circuit. In general, an HDL includes standard, text-based expressions of the spatial and temporal structure and behavior of the electronic system being modeled. HDL syntax and semantics include explicit notations for expressing concurrency. In contrast to most software programming languages, or high level programming languages, HDL also includes an explicit notion of time, which is a primary attribute of a digital system.

One or more aspects of the inventive arrangements disclosed herein may be implemented as a system that includes a data processing system, e.g., a computer, or a data processing system in communication with a programmable IC. One or more aspects of the inventive arrangements described within this disclosure also may be implemented as a method or process performed by, or within, a data processing system and/or a programmable IC. Further aspects may be implemented as a computer readable storage medium storing program code that, when executed by a processor, causes the processor to perform a method.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a block diagram illustrating an exemplary emulation environment 100. As pictured, emulation environment 100 includes a host data processing system (host) 105. Host 105, for example, may be implemented as a computer system or the like. Host 105 is coupled to a target platform 115 through a communication link 125. It should be appreciated that while host 105 is part of emulation environment 100, host 105 may be used without target platform 115 when performing simulations.

Target platform 115 may be implemented as a circuit board such as a printed circuit board having circuitry implemented thereon. Target platform 115 may include a connector that couples to communication link 125. The connector may be coupled, using circuitry of target platform 115, to a socket, receptacle, or other housing that physically and electrically couples IC 120 to target platform 115. In another aspect, IC 120 may be physically and electrically coupled to target platform 115 without a socket, receptacle, or housing. In either case, IC 120 couples to communication link 125 through target platform 115. In one aspect, IC 120 is a programmable IC. In another aspect, IC 120 is a system-on-chip (SOC). IC 120 implements an emulation system that operates under control of host 105.

As noted, host 105 is coupled to target platform 115 through communication link 125. Communication link 125 may be implemented as any of a variety of different wired and/or wireless connections. Exemplary wired implementations of communication link 125 include, but are not limited to, point-to-point Ethernet, Universal Serial Bus (USB), FireWire (IEEE 1394 interface), or the like. Exemplary wireless implementations of communication link 125 include, but are not limited to, Bluetooth®, Wi-Fi®, or the like. In the case of a wireless implementation of communication link 125, the connector of target platform 115 may be implemented as a wireless transceiver. The exemplary communication links noted within this disclosure are provided for purposes of illustration and not intended as limitations.

Host 105 is coupled to a core library 130 through a network 135. Core library 130 is implemented as a computer-readable storage medium, e.g., a network attached storage device, a server, or other data storage device storing one or more cores for use with an EDA system, e.g., host 105. Network 135 is the medium used to provide communication links between various devices and data processing systems connected together within emulation environment 100. Network 135 may include connections, such as wire, wireless communication links, or fiber optic cables. Network 135 can be implemented as, or include, any of a variety of different communication technologies such as a WAN, a LAN, a wireless network, a mobile network, a Virtual Private Network (VPN), the Internet, the Public Switched Telephone Network (PSTN), or the like.

Within FIG. 1, core library 130 is pictured as being separate and independent of host 105. In another aspect, however, core library 130 may be stored within host 105, e.g., on an internal data storage device as opposed to being stored on a network accessible storage device.

In operation, a user selects one or more modeling options using host 105. In one aspect, each modeling option is an item of data scenario data determined from a core stored within core library 130. For example, a user may select a particular data traffic pattern specified as part of a core. In general, the selected modeling option, e.g., a data traffic pattern in this example, is provided to the emulation system within IC 120 and used to configure an emulation circuit of the emulation system. When emulation begins, e.g., under control of host 105, the emulation circuit, which is not a hardware implementation of the core, but rather a different circuit, executes the data traffic pattern thereby causing the emulation circuit to generate data as specified by the data traffic pattern. By implementing the data traffic pattern, the emulation circuit mimics data traffic expected to be generated by the core if implemented within IC 120.

In other cases, the selected modeling option may be used within a simulation conducted within host 105 without using target platform 115. In that case, the selected modeling option, e.g., the data traffic pattern, may be executed by a software model of the particular core from which the data traffic pattern is selected.

Figure 2:
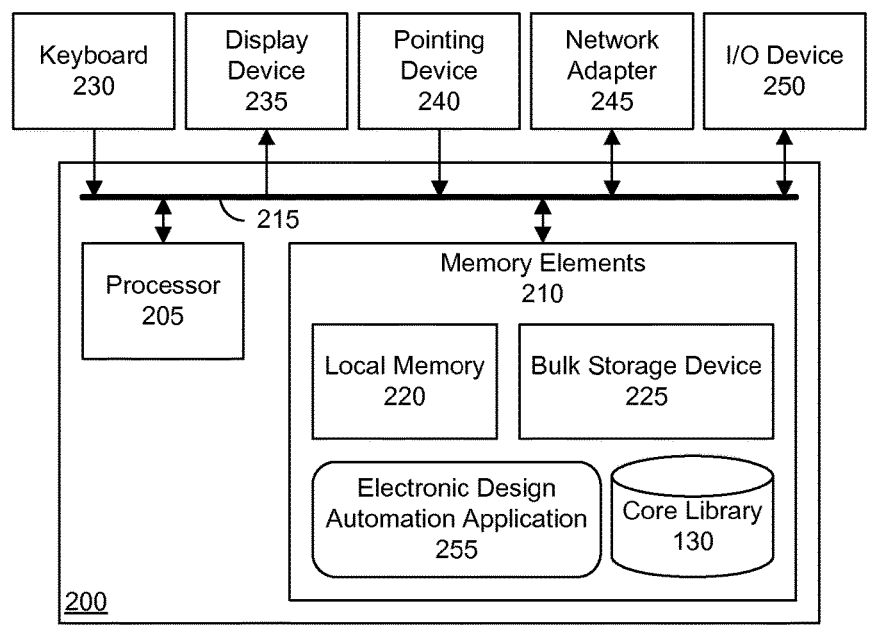
FIG. 2 is a block diagram illustrating an exemplary architecture for the host data processing system of FIG. 1.

FIG. 2 is a block diagram illustrating an exemplary architecture 200 for host 105 of FIG. 1. Architecture 200 includes at least one processor, e.g., a central processing unit (CPU), 205 coupled to memory elements 210 through a system bus 215 or other suitable circuitry. Architecture 200 stores program code within memory elements 210. Processor 205 executes the program code accessed from memory elements 210 via system bus 215. In one aspect, architecture 200 may be used to implement a computer or other data processing system that is suitable for storing and/or executing program code. It should be appreciated, however, that architecture 200 may be used to implement any system including a processor and memory that is capable of performing the functions described within this disclosure.

Memory elements 210 include one or more physical memory devices such as, for example, a local memory 220 and one or more bulk storage devices 225. Local memory 220 may be implemented as a random access memory (RAM) or other non-persistent memory device(s) generally used during actual execution of the program code. Bulk storage device 225 may be implemented as a hard disk drive (HDD), solid state drive (SSD), or other persistent data storage device. Architecture 200 also may include one or more cache memories (not shown) that provide temporary storage of at least some program code in order to reduce the number of times program code must be retrieved from the bulk storage device during execution.

Input/output (I/O) devices such as a keyboard 230, a display device 235, and a pointing device 240 optionally can be coupled to architecture 200. The I/O devices can be coupled to architecture 200 either directly or through intervening I/O controllers. A network adapter 245 also can be coupled to architecture 200 to enable a system implemented using architecture 200 to become coupled to other systems, computer systems, remote printers, remote storage devices, and/or target platform 115 of FIG. 1 through intervening private or public networks. Modems, cable modems, Ethernet cards, and wireless transceivers are examples of different types of network adapter 245 that can be used with architecture 200. An input/output (I/O) device 250 such as a USB port, a FireWire port, or the like also may be coupled to architecture 200 to allow a system implemented using architecture 200 to become coupled to another system such as any of the aforementioned systems including target platform 115 of FIG. 1.

As pictured in FIG. 2, memory elements 210 store an EDA application 255 and core library 130. As noted, core library 130 may be stored in a data storage device external to architecture 200, but accessible to architecture 200. In one aspect, EDA application 255 may include a plurality of different components or modules (not shown). For example, EDA application 255 may include target platform support program code such as a driver for communicating with target platform 115. EDA application 255 also may include user interface program code that, when executed, generates a user interface. EDA application 255 further may include one or more scripts and/or other program code modules.

EDA application 255, being implemented in the form of executable program code, is executed by architecture 200. As such, EDA application 255 is considered an integrated part of a system implemented using architecture 200. Architecture 200, while executing EDA application 255, may communicate with target platform 115 of FIG. 1. EDA application 255 and any data items used, generated, and/or operated upon by architecture 200 executing EDA application 255 are functional data structures that impart functionality when employed as part of architecture 200. Any data items used, generated, or operated upon by an emulation system within an IC, e.g., items of traffic scenario data, are functional data structures that impart functionality when employed as part of the emulation system within the IC. A system such as host 105 that implements architecture 200 is one example of an "EDA system."

Figure 3:
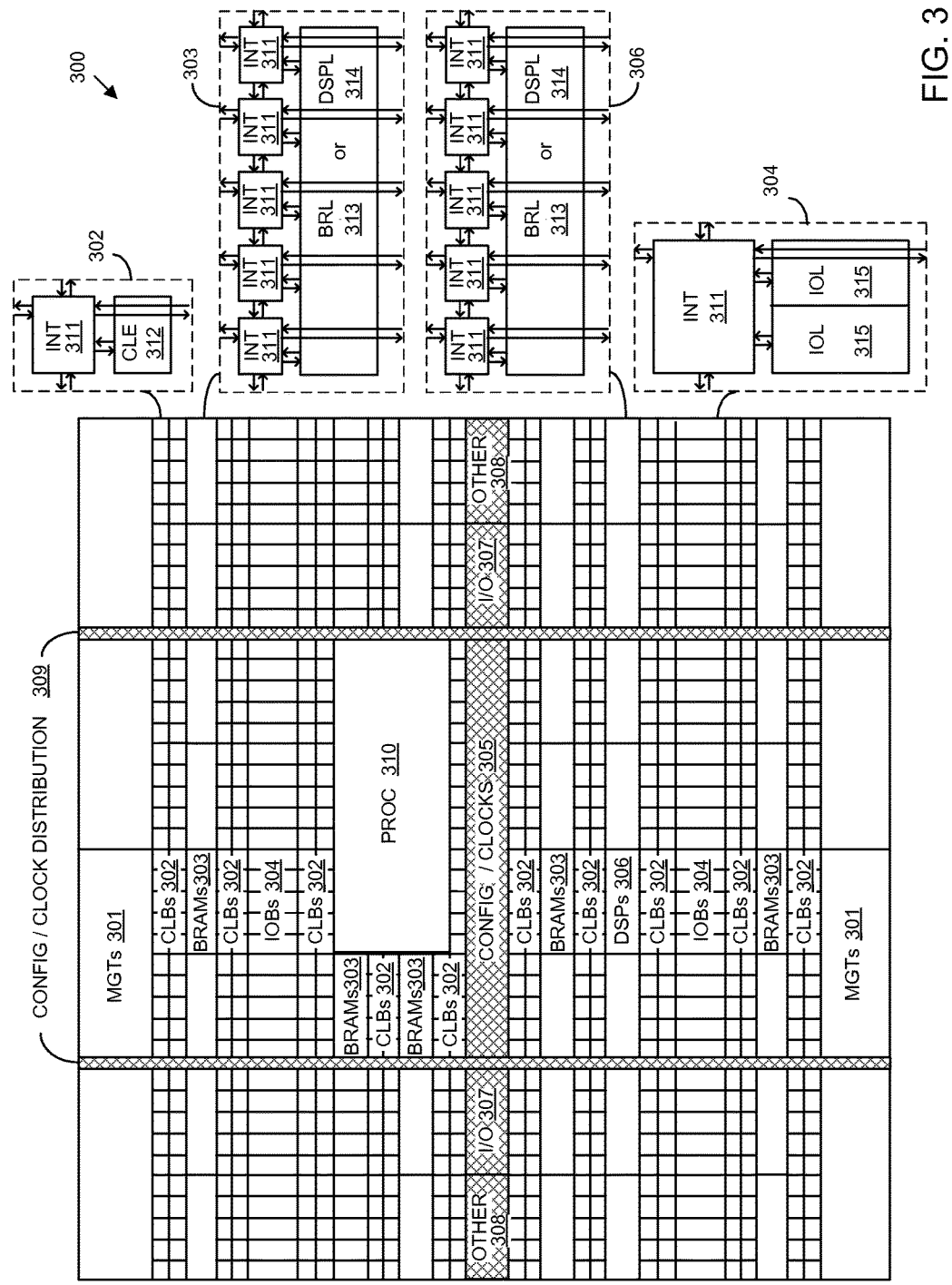
FIG. 3 is a block diagram illustrating an exemplary architecture for an integrated circuit (IC).

FIG. 3 is a block diagram illustrating an exemplary architecture 300 for an IC. For example, architecture 300 may be used to implement IC 120 of FIG. 1. In one aspect, architecture 300 is implemented within a field programmable gate array (FPGA) type of IC. Further, architecture 300 is one example of an SOC architecture.

As shown, architecture 300 includes several different types of programmable circuit, e.g., logic, blocks. For example, architecture 300 can include a large number of different programmable tiles including multi-gigabit transceivers (MGTs) 301, configurable logic blocks (CLBs) 302, random access memory blocks (BRAMs) 303, input/output blocks (IOBs) 304, configuration and clocking logic (CONFIG/CLOCKS) 305, digital signal processing blocks (DSPs) 306, specialized I/O blocks 307 (e.g., configuration ports and clock ports), and other programmable logic 308 such as digital clock managers, analog-to-digital converters, system monitoring logic, and so forth.

In some ICs, each programmable tile includes a programmable interconnect element (INT) 311 having standardized connections to and from a corresponding INT 311 in each adjacent tile. Therefore, INTs 311, taken together, implement the programmable interconnect structure for the illustrated IC. Each INT 311 also includes the connections to and from the programmable logic element within the same tile, as shown by the examples included at the top of FIG. 3.

For example, a CLB 302 can include a configurable logic element (CLE) 312 that can be programmed to implement user logic plus a single INT 311. A BRAM 303 can include a BRAM logic element (BRL) 313 in addition to one or more INTs 311. Typically, the number of INTs 311 included in a tile depends on the height of the tile. As pictured, a BRAM tile has the same height as five CLBs, but other numbers (e.g., four) also can be used. A DSP tile 306 can include a DSP logic element (DSPL) 314 in addition to an appropriate number of INTs 311. An IOB 304 can include, for example, two instances of an I/O logic element (IOL) 315 in addition to one instance of an INT 311. As will be clear to those of skill in the art, the actual I/O pads connected, for example, to IOL 315 typically are not confined to the area of IOL 315.

In the example pictured in FIG. 3, a columnar area near the center of the die, e.g., formed of regions 305, 307, and 308, can be used for configuration, clock, and other control logic. Horizontal areas 309 extending from this column are used to distribute the clocks and configuration signals across the breadth of the programmable IC.

Some ICs utilizing the architecture illustrated in FIG. 3 include additional logic blocks that disrupt the regular columnar structure making up a large part of the IC. The additional logic blocks can be programmable blocks and/or dedicated circuitry. For example, a processor block depicted as PROC 310 spans several columns of CLBs and BRAMs.

In one aspect, PROC 310 is implemented as a dedicated circuitry, e.g., as a hard-wired processor, that is fabricated as part of the die that implements the programmable circuitry of the IC. PROC 310 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 310 is omitted from architecture 300 and replaced with one or more of the other varieties of the programmable blocks described. Further, such blocks can be utilized to form a "soft processor" in that the various blocks of programmable circuitry can be used to form a processor that can execute program code as is the case with PROC 310.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 3 that are external to PROC 310 such as CLBs 302 and BRAMs 303 can be considered programmable circuitry of the IC.

In general, the functionality of programmable circuitry is not established until configuration data is loaded into the IC. A set of configuration bits can be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks that is otherwise non-existent.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC. An example of hardwired circuitry is PROC 310.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 3 is intended to illustrate an exemplary architecture that can be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 3 are purely exemplary. In an actual IC, for example, more than one adjacent column of CLBs is typically included wherever the CLBs appear, to facilitate the efficient implementation of a user circuit design. The number of adjacent CLB columns, however, can vary with the overall size of the IC. Further, the size and/or positioning of blocks such as PROC 310 within the IC are for purposes of illustration only and are not intended as a limitation.

Figure 4:
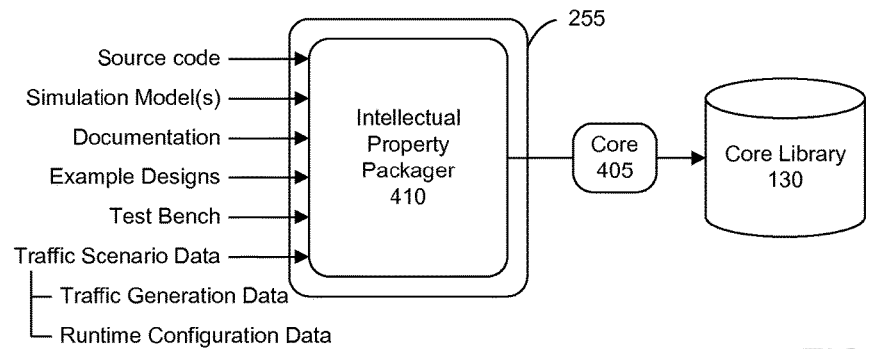
FIG. 4 is a block diagram illustrating the creation of a core including traffic scenario data.

FIG. 4 is a block diagram illustrating the creation of a core 405 including traffic scenario data. In one aspect, EDA application 255 includes a module called an IP property packager 410. IP property packager 410 receives one or more inputs specifying the various files and/or components that are used to create core 405. As shown, for a given core such as core 405, IP packager 410 may receive source code such as HDL source code, simulation models whether expressed in a high level programming language such as C, C+, C++, SystemC, HDL or the like, documentation about the core that is being generated, one or more example designs using core 405, a test bench for core 405, and one or more items of traffic scenario data.

As defined herein, the term "source code" means programming code expressed in human readable form. Traffic scenario data includes runtime configuration data or traffic generation data or both runtime configuration data and traffic generation data. Traffic generation data includes one or more data traffic patterns or a processor program, or both one or more data traffic patterns and a processor program.

As defined herein, the term "runtime configuration data" means one or more settings of target platform 115 and/or IC 120 used to implement an emulation system. Examples of runtime configuration data include, but are not limited to, an IP address of target platform 115, a frequency of operation of a processor within the IC 120, a clock frequency of programmable circuitry of IC 120, a DDR data path for a memory interface of IC 120, or the like. Additional exemplary runtime configuration data may include priorities for DDR ports of IC 120, whether the DDR ports of IC 120 are enabled, settings of a memory interface of IC 120 for an external memory, etc.

As defined within this disclosure, a "data traffic pattern" is a set of instructions that, when executed by a modeling entity, cause the modeling entity to generate data traffic in accordance with the instructions to model, e.g., during emulation or simulation, a core of an electronic system. A data traffic pattern is to be distinguished from the data traffic, or data, that is generated by the particular modeling entity responsive to executing the data traffic pattern.

A processor program, when used in the context of traffic generation data, refers to a program that is executed in the processor system of IC 120 during modeling of an electronic system. The processor program may be an actual, user specified and/or written program or a benchmarking program commonly available and known to those skilled in the art. One example of a benchmarking program is "Imbench," which is a micro-benchmark suite. In general, the processor program defines the data traffic that is generated by the processor of IC 120 and the way in which the processor interacts with emulation circuits also implemented in IC 120 that may receive data traffic from the processor and/or provide data traffic to the processor.

IP packager 410 combines the received inputs, or files, and outputs core 405. In one aspect, IP packager 410 outputs core 405 as one or more IP design files and an eXtensible Markup Language (XML) file formatted, or implemented, as an IP-XACT XML file. IP-XACT is a standard format also known as IEEE 1685-2009. In a further aspect, in addition to the IP design files and the IP-XACT XML file, a graphical user interface (GUI) folder may be included in the output package that may be used by the EDA application to display customization and/or presentation GUIs for core 405.

In one aspect, core 405 may be a package file, e.g., a plurality of files that appear as a single file within a wrapper. The received inputs, or files, are included in the package. The files, as arranged within the package, may be organized into a hierarchy having a defined directory structure. For example, the package may be a "zip" file format or the like. Core 405 may be installed within core library 130. For example, core 405 may be registered within core library 130. Files of core 405 may be stored to appropriate locations within core library 130, e.g., in accordance with the directory structure utilized by core library 130 for storing cores. As such, each constituent file of core 405 may be identified within core library 130 using metadata, the file storage location, or other locating technique so that a user may search and use the various parts of core 405 as required or desired.

In another aspect, rather than including one or more or all of the items of traffic scenario data within core 405, a reference or pointer to such data items may be stored instead. For example, a data traffic pattern stored within core 405 may be associated with a pointer or other reference indicating a particular processor program and/or one or more items of runtime configuration data either stored elsewhere within the core library and/or EDA system or in a location accessible to the EDA system. In yet another aspect, core 405 may include only one or more data traffic patterns and the EDA system may store associations of data traffic patterns to items of runtime configuration data and/or processor programs stored outside of core 405. In that case, the EDA system may correlate a user selected data traffic pattern with the other items of traffic scenario data as described in greater detail herein.

Figure 5:
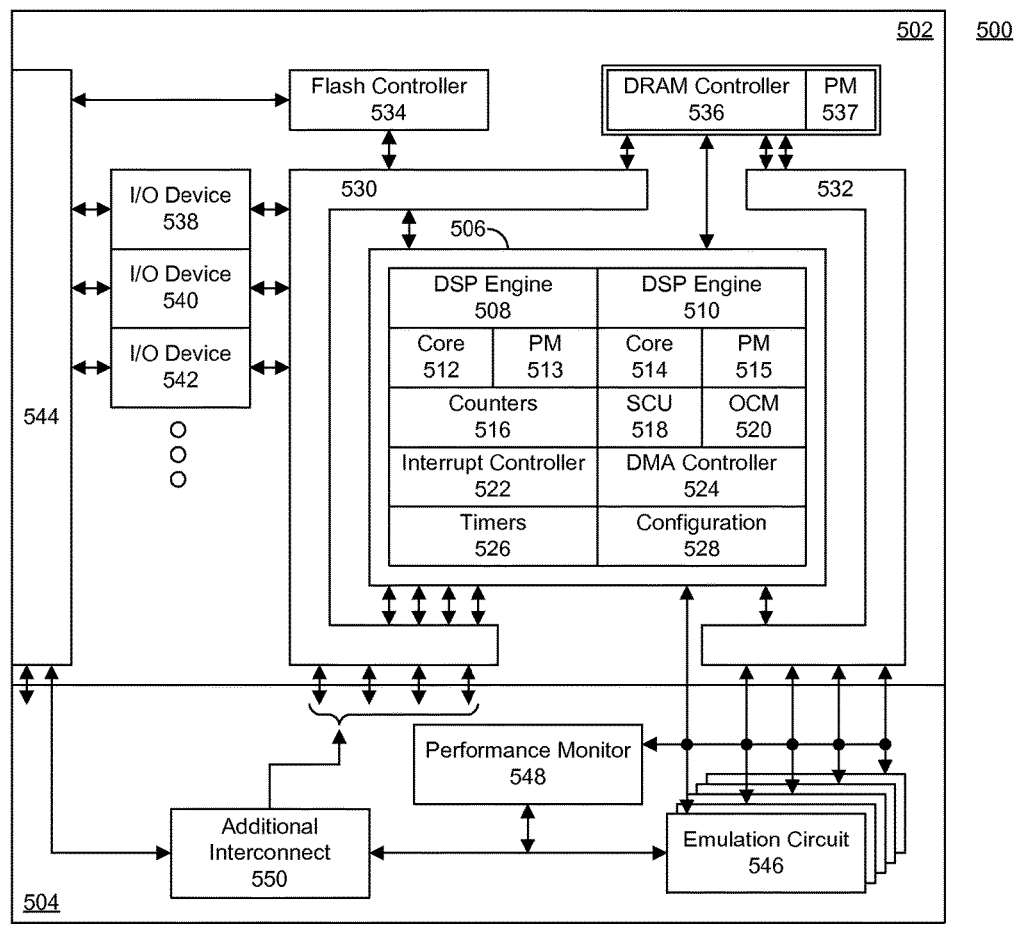
FIG. 5 is a block diagram illustrating an exemplary implementation of an emulation system.

FIG. 5 is a block diagram illustrating an exemplary emulation system 500. Emulation system 500 may be implemented within IC 120. In one aspect, emulation system 500 may be preloaded into the FPGA for operation and use with host 105. In another aspect, emulation system 500 may be stored within host 105 and automatically loaded into IC 120 by host 105 without the user having to create a circuit design implementing emulation system 500, e.g., responsive to user selection of one or more modeling options, e.g., a data traffic pattern.

Emulation system 500 includes a processor system 502 and programmable circuitry 504. Processor system 502 is hardwired. As such, the various elements pictured within processor system 502 exist within IC 120 without first having to load configuration data, i.e., a configuration bitstream. By comparison, programmable circuitry 504 is not hardwired. Programmable circuitry 504, as described herein, includes one or more programmable circuit blocks or tiles that are configured to form particular circuit structures and/or systems that perform particular operations and/or functions only after configuration data is loaded into IC 120 and stored in configuration memory cells.

Processor system 502 includes a processor complex 506, also referred to as a processor. In the example shown, processor complex 506 includes two cores. It should be appreciated, however, that processor complex 506 may be a single core processor or include more than two cores. Processor complex 506 includes DSP engines 508 and 510, cores 512 and 514, performance monitors 513 and 515, counters 516, a snoop control unit (SCU) 518, and an on-chip memory (OCM) 520. Processor complex 506 also includes an interrupt controller 522, a direct memory access (DMA) controller 524, timers 526, and configuration block 528 including one or more configuration registers.

Each of performance monitors 513 and 515 is implemented as circuitry including a plurality of counters that count the occurrence of selected events within PS 502. For example, each of performance monitors 513 and 515 may be configured, through associated control registers, to count any of a plurality of different events occurring within core complex 506. Examples of different events that may be detected and counted include, but are not limited to, execution of Java bytecode, external interrupts, instruction cache dependent stall cycles, data cache dependent stall cycles, reaching a particular program counter value, and the like. Data collected by performance monitors 513 and 515 may be sent to the host for evaluation and/or further processing. In one aspect, performance monitor 513 and performance monitor 515 may be implemented as a Performance Monitoring Unit as included within the Cortex®-A series of processors, e.g., the Cortex®-A9, available from ARM Limited.

Core complex 506 is communicatively linked with other elements within processor system 502 through on-chip interconnects 530 and 532. One example of an interconnect structure that may be used to implement interconnects 530 and/or 532 is the Advanced Microcontroller Bus Architecture (AMBA®) Interconnect available from ARM Limited. Interconnects 530 and 532 provide on-chip connection and management of functional blocks in an SOC.

Interconnect 530 couples core complex 506 to a flash controller 534, DRAM controller 536 and associated performance monitor 537, and one or more I/O devices 538, 540, and 542. Interconnect 530 further provides communication links into programmable circuitry 504 that couple various circuits and/or systems that may be implemented within programmable circuitry 504 to core complex 506. Interconnect 532 couples core complex 506 to DRAM controller 536 and associated performance monitor 537. Interconnect 532 also couples core complex 506 to a plurality of emulation circuits 546 within programmable circuitry 504. As shown, DRAM controller 536 also is directly coupled to core complex 506. Similarly, one or more of emulation circuits 546 may directly couple to core complex 506.

Performance monitor 537 may include a plurality of counters that count the occurrence of selected events within DRAM controller 536. Data collected by performance monitor 537, as is the case with any of the other performance monitors, may be sent to host 105 by core complex 506 for evaluation and/or further processing.

I/O devices 538, 540, and 542 are representative of a plurality of different types of I/O devices, e.g., peripherals, that may be included within processor system 502. Processor system 502 may include more or fewer I/O devices than shown. Exemplary I/O devices represented by I/O devices 538, 540, and 542 may include, but are not limited to, one or more of a Serial Peripheral Interface (SPI) bus, an Inter-Integrated Circuit (I²C) bus, a Controller Area Network (CAN) bus, a Universal Asynchronous Receiver/Transmitter (UART), a General Purpose Input/Output (GPIO), a Secure Digital Input Output (SDIO) with DMA, a USB with DMA, a gigabit Ethernet (GigE) with DMA, or the like.

I/O devices 538, 540, and 542 are coupled to an I/O multiplexer 544. I/O multiplexer 544 receives signals from I/O devices 538, 540, and 542, and from flash controller 534, and selectively routes the signals to I/O pins of the IC and/or into programmable circuitry 504. Similarly, I/O multiplexer 544 may selectively route signals from I/O pins of the IC into programmable circuitry 504 and/or into one or more of I/O devices 538, 540, and/or 542, and/or flash controller 534.

Programmable circuitry 504 includes a plurality of emulation circuits 546, performance monitor 548, and additional interconnect block 550. Additional interconnect block 550 represents hardwired interconnects implemented within programmable circuitry 504 that allow circuit blocks and/or systems implemented within programmable circuitry 504 to couple to processor system 502. In this regard, though shown within programmable circuitry 504, additional interconnect block 550 is circuitry that crosses a boundary between programmable circuitry 504 and processor system 502.

Emulation circuits 546 and performance monitor 548 are circuit blocks implemented within programmable circuitry 504 responsive to the loading of configuration data such as a configuration bitstream. In one aspect, each of emulation circuits 546 is implemented as a configurable data traffic generator. Each of emulation circuits 546 may generate data, send data to processor system 502, and/or receive data from processor system 502. The amount of data generated, the frequency of the data, and the like are configurable using data traffic patterns. Once emulation circuits 546 are formed by loading configuration data, each of emulation circuits 546 may receive a data traffic pattern from processor system 502 specifying data traffic that one or more or all of the emulation circuits 546 are to generate. In another aspect, each of emulation circuits 546 may receive a data traffic pattern from host 105 through I/O 544 specifying data traffic that one or more or all of emulation circuits 546 are to generate. Each emulation circuit 546 may implement a data traffic pattern that is selected independently of the data traffic pattern selected for each other emulation circuit 546.

In one aspect, each of emulation circuits 546 can be implemented as similar or identical circuits. Each of emulation circuits 546 can include a first communication port (not shown) that is coupled to processor system 502. Each of emulation circuits 546 can include a second port that is also coupled to processor system 502. Accordingly, processor system 502 may have two independent interfaces to each of emulation circuits 546.

One port of each emulation circuit 546 may be reserved for receiving data traffic patterns and/or other instructions from processor system 502. In implementations where emulation circuits 546 are controlled by host 105 via I/O multiplexer 544, the port reserved for receiving data traffic patterns and/or other instructions may be coupled to I/O multiplexer 544 via additional interconnect 550.

The other port of each emulation circuit 546 may be used for sending actual data generated from executing a data traffic pattern and/or for receiving data from another source.

Processor system 502 may send data traffic patterns to the emulation circuits 546 through the reserved port. Each of emulation circuits 546 is effectively programmed, using the data traffic pattern, to mimic the behavior of the particular core from which each data traffic pattern is selected or belongs. Accordingly, each of emulation circuits 546 may emulate, or model, any of a variety of different applications in which the modeled core is expected to have specific data processing requirements. The data traffic pattern, in combination with a software program executing in core complex 506, for example, results in the generation of data traffic from core complex 506 to emulation circuit(s) 546 and the generation of data traffic from emulation circuits 546 to core complex 506. The data expected to be generated and consumed by a core such as a video codec, a particular DSP unit, or the like may be modeled. In this regard, each emulation circuit 546 may write data, e.g., generate data traffic, and consume or read data traffic, e.g., receive traffic, that would be characteristic of the particular core from which the data traffic pattern is selected.

For example, a data traffic pattern provided to an emulation circuit 546 may specify one or more commands for moving data between processor system 502 and the emulation circuit 546. The various commands can include read commands, write commands, or a combination of read and write commands. Each respective read and/or write command can specify an amount of data that is to be read or written. Each read and/or write command also can specify a "delay" parameter that indicates the amount of time to wait before emulation circuit 546 is to implement the command after the prior command executes (e.g., after the prior transaction completes). In addition, each of emulation circuits 546 can be configured to implement a repeat, e.g., loop, mode. In the repeat mode, the same sequence of commands can be repeated for a particular number of times as specified by the data traffic pattern provided to emulation circuit 546.

In one example, the data traffic patterns allow emulation circuits 546 to emulate a circuit block that is polled by processor complex 506. In another example, the data traffic pattern may cause an emulation circuit 546 to emulate a circuit block that is interrupt driven, or the like. In still a further example, the data traffic pattern may cause an emulation circuit 546 to model or emulate the behavior of an off-chip interface such as an interface for an off-chip memory or the like. The data traffic pattern may cause emulation circuits 546 to mimic various types of data transfers, including, DMA transfers, create dependencies among individual ones of emulation circuits 546, and/or create dependencies between one or more other emulation circuits 546 and/or processor system 502.

In one example, each of emulation circuits 546 may be implemented as a LogiCORE IP AXI Traffic Generator (Traffic Generator) available from Xilinx Inc. of San Jose, Calif. In general, each Traffic Generator is configurable to generate and accept data according to different traffic profiles, e.g., the data traffic patterns, supports dependent/independent transactions between read/write master port with configurable delays, is programmable to repeat count for each transaction with constant, increment, or random addressing, externally controllable to start and stop traffic generation with or without processor intervention, and generate IP-specific traffic without processor intervention.

Performance monitor 548 is coupled to the signal lines, e.g., interconnects, between emulation circuits 546 and processor system 502 as well as the signal lines between emulation circuits 546 and additional interconnect block 550. Performance monitor 548 monitors the data traffic implemented on the various signal lines connecting emulation circuits 546 with processor system 502, whether the signal lines are direct connections between emulation circuits 546, traverse through interconnect 530 and/or 532, and/or traverse through additional interconnect block 550. Performance monitor 548 may determine various parameters or values passing on the signal lines during emulation. Performance monitor 548, for example, identifies or detects information on the various signal lines shown such as timestamps of start and end times, address information, or the like. In one aspect, the additional interconnects may be implemented as AXI Interconnects and/or AXI Lite Interconnects.

Performance monitor 548 may store collected measurement data within memory of programmable circuitry 504. Core complex 506 may access the stored measurement data and send the measurement data to the host data processing system for evaluation and/or further processing.

In one example, performance monitor 548 may be implemented as one or more LogiCORE IP AXI Performance Monitors (AXI Performance Monitor) available from Xilinx Inc. The AXI Performance Monitor enables AXI system performance measurement for multiple slots, e.g., AXI4, AXI3, AXI4-Stream, and AXI4-Lite. The AXI Performance Monitor may capture real-time performance metrics for throughput and latency for connected AXI interfaces. The AXI Performance Monitor can log AXI transactions, external system events, and perform real-time profiling for software applications.

Figure 6:
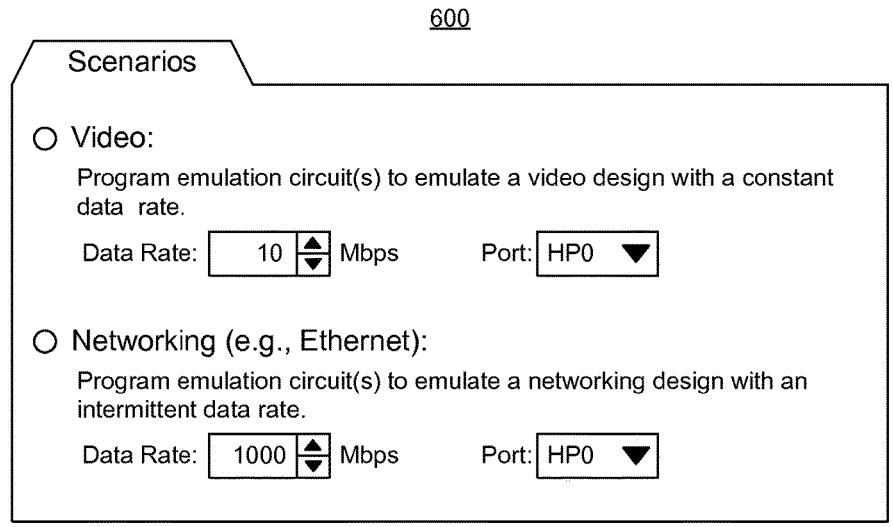
FIG. 6 is a view of an exemplary user interface that receives user input specifying a data traffic pattern.

FIG. 6 is a view of an exemplary user interface 600 that receives user input specifying a data traffic pattern. User interface 600 is generated by host 105. Through user interface 600, a user may specify one or more items of traffic scenario data that, when taken collectively, specify a data traffic pattern. For example, the core library accessed by host 105 may include a video processing core that includes traffic scenario data. The video processing core processes data with a constant data rate at any of a variety of data rates and may do so over any of a plurality of different ports when implemented within the IC. The available data traffic patterns from the traffic scenario data of the video processing core are presented in combination with the "video" option of user interface 600. The user may select the "video" radio button and further select a particular data traffic pattern through selection of a data rate and a port. The available options that may be selected using user interface 600 in relation to "video" are limited to the data traffic patterns stored within the video processing core or cores.

Similarly, the core library accessed by host 105 may include a networking core that includes traffic scenario data. The networking core processes data with an intermittent data rate. The networking core may process data with an average data rate that may be specified through user interface 600 and may do so over any of a plurality of different ports when implemented within the IC. The available data traffic patterns from the traffic scenario data of the networking core are presented in combination with the "networking" option of user interface 600. The user may select the "networking" radio button and further select a particular data traffic pattern through selection of a data rate and a port. The available options within user interface 600 in relation to "networking" are limited to the data traffic patterns stored within the networking core or cores.

User inputs selecting options, i.e., a data traffic pattern, through user interface 600 further may specify a processor program and optionally runtime configuration data. For example, particular data traffic patterns may be associated with other items of traffic scenario data such as particular processor programs and/or particular runtime configuration settings in order to effectuate modeling of the selected data traffic pattern. As noted, such associated items of traffic scenario data may be stored as part of each core. In another aspect, the associated items of traffic scenario data may be stored within the core library and/or EDA system or elsewhere with either a reference to such data items stored in the core(s) or the EDA system maintaining the associations.

User interface 600 illustrates that a user may choose various modeling options using host 105. The emulation system within the IC, responsive to the user selected modeling options, models the specified options. This process does not require the user to have any domain specific knowledge of video processing or networking. Moreover, the performance of the architecture of IC 120 may be evaluated without having to implement an actual, functioning video processing or networking system therein.

FIG. 6 is presented for purposes of illustration only. It should be appreciated that any of a variety of different interface types and/or controls may be provided through which a user may select and/or specify a particular data traffic pattern. Further, the example of FIG. 6 illustrates a case where at least two cores, e.g., at least one video processing core and at least one networking core, store traffic scenario data. In the event that other cores store traffic scenario data, then options for selecting data traffic patterns for the cores may be presented also. For example, data traffic patterns for additional video processing cores may be selected through the "video" section of user interface 600. By comparison, data traffic patterns of a core of a completely different type or application may be listed separately as a new category in addition to "video" and "networking".

Figure 7:
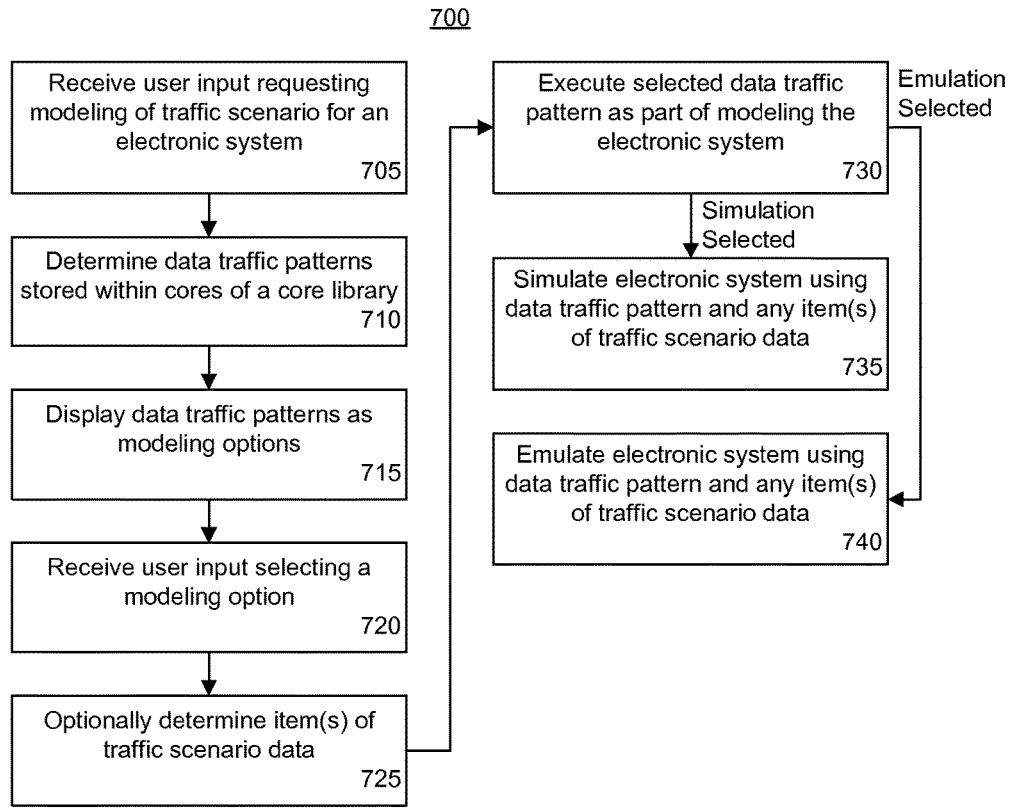
FIG. 7 is a flow chart illustrating an exemplary method of modeling an electronic system.

FIG. 7 is a flow chart illustrating an exemplary method 700 of modeling an electronic system. In one aspect, method 700 is implemented using an emulation environment as described with reference to FIG. 1. In another aspect, method 700 may be implemented using an EDA system such as the host of FIG. 1, for example, in cases where simulation is to be performed.

Method 700 may begin in a state where the host is executing the EDA application. In block 705, the host receives a user input requesting modeling of a traffic scenario for an electronic system. As defined herein, the term "traffic scenario" means a flow of data between two or more components such as processor blocks, a processor, or the like within an IC, e.g., an SOC. In block 710, the host determines one or more data traffic patterns within cores of a core library. The host may determine the data traffic patterns responsive to the received user input. For example, the host may parse the core library for available data traffic patterns of the core(s) stored therein.

In block 715, the host displays the determined data traffic patterns to the user. The located data traffic patterns are exposed by displaying the data traffic patterns, or portions thereof as illustrated in FIG. 6, through a user interface in which the user may select one or more desired parameters that, taken collectively, match and thereby select a particular data traffic pattern. As noted with respect to FIG. 6, for example, the selectable parameters presented to the user may be constrained to those corresponding to available data traffic patterns and, further, may be grouped according to application of each respective core.

In block 720, the host receives a user input selecting a modeling option. The selected modeling option specifies a data traffic pattern to be used for modeling the electronic system. In block 725, the host optionally determines one or more items of traffic scenario data associated with the selected data traffic pattern. As discussed, the host may determine any items of traffic scenario data stored in a core with the selected data traffic pattern and/or determine any items of traffic scenario data associated with the selected data traffic pattern but not stored within the core that includes the selected data traffic pattern.

In block 730, the selected data traffic pattern is executed as part of modeling the electronic system. In executing the selected data traffic pattern, a user may select either simulation or emulation as the modeling option. In the case where simulation is selected, method 700 proceeds to block 735. In the case where emulation is selected, method 700 continues to block 740.

In block 735, the host simulates the electronic system using the selected data traffic pattern. The selected data traffic pattern, as well as any determined item(s) of traffic scenario data associated with the selected data traffic pattern, may be executed as part of a simulation of the electronic system performed within the host. The selected data traffic pattern may be executed by a software model also executing within the host. Other data items of runtime configuration data and/or a processor program associated with the selected data traffic pattern may be used to specify further preferences or settings for the simulation.

In block 740, the electronic system is emulated. The selected data traffic pattern, as well as any determined item(s) of traffic scenario data associated with the selected data traffic pattern, may be provided to the target platform and IC in which the emulation system is implemented. The data traffic pattern is loaded into an emulation circuit and executed. For example, the data traffic pattern configures the emulation circuit to generate the data traffic specified by the data traffic pattern. Any other data items of runtime configuration data and/or a processor program associated with the selected data traffic pattern also may be provided to the IC for implementation. In some cases, however, particular items of runtime configuration data may need to be incorporated into the configuration bitstream specifying the emulation system at a deeper level. In that case, the configuration bitstream may be regenerated to incorporate the necessary runtime configuration data and provided to the IC to implement the properly configured emulation system.

In another aspect, the selected data traffic pattern may be incorporated into a configuration bitstream that specifies the emulation system. In that case, for example, any other data items of runtime configuration data and/or a processor program associated with the selected data traffic pattern may be incorporated into the configuration bitstream. The configuration bitstream then may be provided to the IC to implement the emulation system with the emulation circuit (s) already configured to execute the selected data traffic pattern.

As noted, the processor and the emulation circuits generate data traffic. In one aspect, neither the processor system nor the emulation circuits are performing actual system functions. For example, each may generate "dummy" data, send the dummy data, and/or receive the dummy data in a manner that mimics a desired behavior so that the system, as a whole, may be evaluated. As defined within this specification, "dummy data" refers to benign or harmless data. Dummy data is meaningless data that serves as a placeholder for testing purposes. Dummy data, for example, may be randomly generated, include repeating patterns, etc.

In another aspect, however, the processor system may execute actual system program code that uses and/or generates real data as opposed to dummy data. Since the emulation circuits do not actually operate upon the content of the data received from the processor system, the emulation circuits will operate as described whether the processor system sends dummy data or real data.

In some cases, the emulation circuits utilize dummy addresses. For example, addresses may be generated as sequential values or random values according to the user selected data traffic pattern to mimic the intended core and application. In other cases, however, the emulation circuits may use actual addresses.

Figure 8:
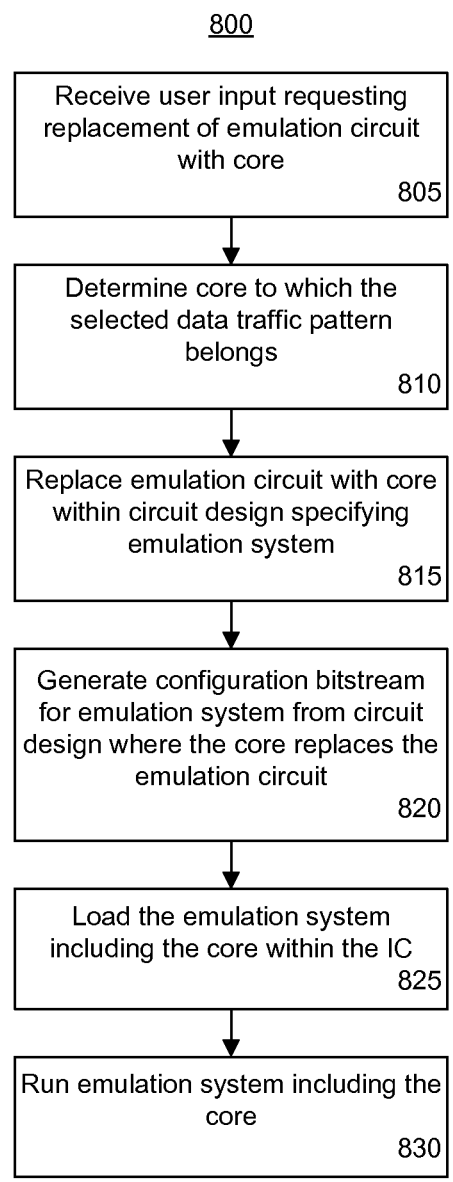
FIG. 8 is a flow chart illustrating an exemplary method of incorporating a core into an emulation system.

FIG. 8 is a flow chart illustrating an exemplary method 800 of incorporating a core into an emulation system. Method 800 may be performed using the emulation environment 100 of FIG. 1. Method 800 may begin in a state where a user has already selected one or more data traffic patterns for modeling. The modeling through emulation.

In block 805, the host receives a user input requesting replacement of an emulation circuit with an implementation of a core. For example, the user may wish to evaluate the performance of the actual core currently emulated in the IC using a data traffic pattern. The user request may indicate that the user would like to substitute a core for a selected data traffic pattern. In block 810, responsive to the user input of block 805, the host determines the particular core in which the selected data traffic pattern is stored.

In block 815, the host replaces an emulation circuit with the core determined in block 810 within the circuit design specifying the emulation system. In block 820, the host generates a configuration bitstream specifying the emulation system. Rather than specifying the emulation system in its entirety as previously described within this disclosure, the configuration bitstream specifies an implementation of the core determined in block 810 in place of the emulation circuit that otherwise executed the data traffic pattern.

For example, consider the case in which the user modeled a data traffic pattern of core 405. Responsive to a request to include an implementation of core 405, the emulation circuit that executed the data traffic pattern of core 405 is replaced with an actual implementation of core 405. In replacing the emulation circuit with the core, the host presumes that the interface of the emulation circuit matches, e.g., is the same as, the interface of the core.

In block 825, the configuration bitstream specifying the emulation system with the core is loaded into the IC, thereby implementing the emulation system therein. As such, the emulation circuit is replaced within the IC with an implementation of the core. In block 830, the emulation system including the core is run.

In accordance with the inventive arrangements described within this disclosure, cores are described that incorporate traffic scenario data. The traffic scenario data of various cores stored in a core library may be exposed to a user through an EDA system. Exposure of the traffic scenario data allows the user to select various modeling options and evaluate performance of the core within an electronic system without requiring domain specific knowledge, without having to design the electronic system, and without having to implement the core within the electronic system. Runtime configuration data and other data items necessary for modeling the electronic system may be associated with, or included within, the traffic scenario data so that selection of a particular data traffic pattern is all that is necessary to fully configure an emulation system and evaluate performance of the core through modeling.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

The terms "a" and "an," as used herein, are defined as one or more than one. The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

The term "and/or" as defined herein means any and all possible combinations of one or more of the associated listed items. It will be further understood that the terms "includes" and/or "including," when used in this disclosure, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Within this disclosure, the same reference characters are used to refer to terminals, signal lines, wires, and their corresponding signals. In this regard, the terms "signal," "wire," "connection," "terminal," and "pin" may be used interchangeably, from time-to-time, within this disclosure. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

One or more aspects described within this disclosure can be realized in hardware or a combination of hardware and software. One or more aspects can be realized in a centralized fashion in one system or in a distributed fashion where different elements are spread across several interconnected systems. Any kind of data processing system or other apparatus adapted for carrying out at least a portion of the methods described herein is suited.

One or more aspects further can be embedded in a computer program product, which includes all the features enabling the implementation of the methods described herein. The computer program product includes a computer readable storage medium. As defined herein, the term "computer-readable storage medium" means a non-transitory storage medium that contains or stores program code for use by or in connection with an instruction execution system, apparatus, or device. The program code, when loaded and executed in a system including a processor, causes the processor to initiate and/or perform at least a portion of the functions and/or operations described within this disclosure. Examples of computer readable storage media include, but are not limited to, optical media, magnetic media, magneto-optical media, computer memory such as random access memory, a bulk storage device, e.g., hard disk, or the like.

Accordingly, the flowchart and block diagrams in the Figures illustrate the architecture, functionality, and operation of possible implementations of systems, methods and computer program products according to various aspects of the inventive arrangements disclosed herein. In this regard, each block in the flowchart or block diagrams may represent a module, segment, or portion of code, which includes one or more executable instructions for implementing the specified logical function(s). It should also be noted that, in some alternative implementations, the functions noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terms "computer program," "software," "application," "computer-usable program code," "program code," "executable code," variants and/or combinations thereof, in the present context, mean any expression, in any language, code or notation, of a set of instructions intended to cause a data processing system to perform a particular function either directly or after either or both of the following: a) conversion to another language, code, or notation; b) reproduction in a different material form. For example, program code can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

Thus, throughout this disclosure, statements utilizing terms such as "processing" or "computing" or "calculating" or "determining" or "displaying" or the like, refer to the action and processes of a data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

The corresponding structures, materials, acts, and equivalents of all means or step plus function elements in the claims below are intended to include any structure, material, or act for performing the function in combination with other claimed elements as specifically claimed.

A method includes determining, using a processor, data traffic patterns stored within a core library of an electronic design automation system, wherein the data traffic patterns are part of cores stored within the core library, and displaying, using a display device, the determined data traffic patterns as modeling options. The method further includes receiving a user input selecting a displayed data traffic pattern and executing the selected data traffic pattern as part of modeling an electronic system.

Executing the selected data traffic pattern as part of modeling the electronic system may include providing the selected data traffic pattern to an emulation circuit implemented within an IC. The emulation circuit executes the selected data traffic pattern.

In one aspect, the emulation circuit executing the selected data traffic pattern emulates an off-chip interface of the electronic system.

The selected data traffic pattern may be provided to the IC subsequent to implementation of the emulation circuit. In another aspect, the emulation circuit may be implemented within the IC including the selected data traffic pattern.

In a further aspect, executing the selected data traffic pattern as part of modeling an electronic system may include simulating the electronic system using the selected data traffic pattern.

The method also may include determining an item of traffic scenario data associated with the selected data traffic pattern, wherein the item of traffic scenario data is at least one of an item of runtime configuration data or a processor program, and using the item of traffic scenario data during modeling of the electronic system.

A system includes a host data processing system including a memory storing program code, a display device, and a processor coupled to the memory and the display device. The processor, upon executing the program code, is programmed to initiate executable operations including determining data traffic patterns stored within a core library of an electronic design automation system, wherein the data traffic patterns are part of cores stored within the core library, and displaying on the display device the determined data traffic patterns as modeling options. The executable operations further include receiving a user input selecting a displayed data traffic pattern and executing the selected data traffic pattern as part of modeling an electronic system.

The system also may include an IC having an emulation system coupled to the host data processing system, wherein executing the selected data traffic pattern as part of modeling the electronic system includes providing the selected data traffic pattern to an emulation circuit implemented within the IC. The emulation circuit executes the selected data traffic pattern.

In one aspect, the emulation circuit executing the selected data traffic pattern emulates an off-chip interface of the electronic system.

The processor of the host data processing system further may initiate executable operations including providing the selected data traffic pattern to the IC subsequent to implementation of the emulation circuit. In another aspect, the emulation circuit may be implemented within the IC including the selected data traffic pattern.

Executing the selected data traffic pattern as part of modeling an electronic system also may include simulating the electronic system using the selected data traffic pattern.

The processor of the host data processing system further may initiate executable operations including determining an item of traffic scenario data associated with the selected data traffic pattern, wherein the item of traffic scenario data is at least one of an item of runtime configuration data or a processor program, and using the item of traffic scenario data during modeling of the electronic system.

A non-transitory computer-readable medium has instructions which, when executed by a processor, perform a method. The method includes determining, using the processor, data traffic patterns stored within a core library of an electronic design automation system, wherein the data traffic patterns are part of cores stored within the core library, and displaying, using a display device, the determined data traffic patterns as modeling options. The method further includes receiving a user input selecting a displayed data traffic pattern and executing the selected data traffic pattern as part of modeling an electronic system.

Executing the selected data traffic pattern as part of modeling the electronic system may include providing the selected data traffic pattern to an emulation circuit implemented within an IC. The emulation circuit executes the selected data traffic pattern.

The method also may include providing the selected data traffic pattern to the IC subsequent to implementation of the emulation circuit.

The method further may include implementing, within the IC, the emulation circuit comprising the selected data traffic pattern.

Executing the selected data traffic pattern as part of modeling an electronic system further may include simulating the electronic system using the selected data traffic pattern.

The method also may include determining an item of traffic scenario data associated with the selected data traffic pattern, wherein the item of traffic scenario data is at least one of an item of runtime configuration data or a processor program, and using the item of traffic scenario data during modeling of the electronic system The features described within this disclosure can be embodied in other forms without departing from the spirit or essential attributes thereof. Accordingly, reference should be made to the following claims, rather than to the foregoing disclosure, as indicating the scope of such features and implementations.

What is claimed is:

1. A method, comprising:
   determining, using a processor of a data processing system, data traffic patterns stored within a core library of an electronic design automation system;
   wherein the data traffic patterns are specified by cores stored within the core library;
   displaying, using a display device, the determined data traffic patterns as modeling options;
   receiving a user input selecting a displayed data traffic pattern associated with a selected core; and
   executing the selected data traffic pattern as part of modeling an electronic system to generate data traffic that mimics operation of the selected core by programming an emulation circuit implemented within an integrated circuit with the selected data traffic pattern and executing the selected data traffic pattern to generate the data traffic between the emulation circuit and a processor system of the integrated circuit.

2. The method of claim 1, wherein the emulation circuit executing the selected data traffic pattern emulates an off-chip interface of the electronic system.

3. The method of claim 2, further comprising:
   responsive to a user input, replacing the emulation circuit within the integrated circuit with an implementation of the selected core.

4. The method of claim 3, wherein replacing the emulation circuit within the integrated circuit comprises:
   generating a configuration bitstream wherein the selected core replaces the emulation circuit and providing the configuration bitstream to the integrated circuit for implementation therein.

5. The method of claim 1, wherein executing the selected data traffic pattern as part of modeling an electronic system comprises:
   simulating the electronic system using the data processing system by using a software model to execute the selected data traffic pattern to generate the data traffic.

6. The method of claim 1, further comprising:
   determining an item of traffic scenario data associated with the selected data traffic pattern;
   wherein the item of traffic scenario data is at least one of an item of runtime configuration data or a processor program; and
   executing the item of traffic scenario data using the processor system of the integrated circuit during modeling of the electronic system.

7. A system, comprising:
   a host data processing system comprising a memory storing program code, a display device, and a processor coupled to the memory and the display device;
   wherein the processor, upon executing the program code, is programmed to initiate executable operations comprising:
      determining data traffic patterns stored within a core library of an electronic design automation system;
      wherein the data traffic patterns are specified by cores stored within the core library;
      displaying on the display device the determined data traffic patterns as modeling options;
      receiving a user input selecting a displayed data traffic pattern associated with a selected core; and
      executing the selected data traffic pattern as part of modeling an electronic system to generate data traffic that mimics operation of the selected core by programming an emulation circuit implemented within an integrated circuit with the selected data traffic pattern and executing the selected data traffic pattern to generate the data traffic between the emulation circuit and a processor system of the integrated circuit.

8. The system of claim 7, wherein the emulation circuit executing the selected data traffic pattern emulates an off-chip interface of the electronic system.

9. The system of claim 7, wherein the processor of the host data processing system further initiates executable operations comprising:
   responsive to a user input, replacing the emulation circuit within the integrated circuit with an implementation of the selected core.

10. The system of claim 8, wherein replacing the emulation circuit within the integrated circuit comprises:
   generating a configuration bitstream specifying the emulation system wherein the core replaces the emulation circuit and providing the configuration bitstream to the integrated circuit for implementation therein.

11. The system of claim 7, wherein executing the selected data traffic pattern as part of modeling an electronic system comprises:
- simulating the electronic system using the host data processing system by using a software model to execute the selected data traffic pattern to generate the data traffic.

12. The system of claim 7, wherein:
- the processor of the host data processing system further initiates executable operations comprising determining an item of traffic scenario data associated with the selected data traffic pattern, wherein the item of traffic scenario data is at least one of an item of runtime configuration data or a processor program; and
- the processor system of the integrated circuit is configured to execute the item of traffic scenario data during modeling of the electronic system.

13. A non-transitory computer-readable medium having instructions which, when executed by a processor, perform a method comprising:
- determining, using the processor, data traffic patterns stored within a core library of an electronic design automation system;
- wherein the data traffic patterns are specified by cores stored within the core library;
- displaying, using a display device, the determined data traffic patterns as modeling options;
- receiving a user input selecting a displayed data traffic pattern associated with a selected core; and
- executing the selected data traffic pattern as part of modeling an electronic system to generate data traffic that mimics operation of the selected core by programming an emulation circuit implemented within an integrated circuit with the selected data traffic pattern and executing the selected data traffic pattern to generate the data traffic between the emulation circuit and a processor system of the integrated circuit.

14. The non-transitory computer-readable medium of claim 13, wherein the method further comprises:
- responsive to a user input, replacing the emulation circuit within the integrated circuit with an implementation of the selected core.

15. The non-transitory computer-readable medium of claim 14, wherein the method further comprises:
- generating a configuration bitstream for the emulation system wherein the selected core replaces the emulation circuit and providing the configuration bitstream to the integrated circuit for implementation therein.

16. The non-transitory computer-readable medium of claim 13, wherein executing the selected data traffic pattern as part of modeling an electronic system comprises:
- simulating the electronic system using the processor by using a software model to execute the selected data traffic pattern to generate the data traffic.

17. The non-transitory computer-readable medium of claim 13, wherein the method further comprises:
- determining an item of traffic scenario data associated with the selected data traffic pattern;
- wherein the item of traffic scenario data is at least one of an item of runtime configuration data or a processor program; and
- executing the item of traffic scenario data using the processor system of the integrated circuit during modeling of the electronic system.

* * * * *